United States Patent
Sugitani et al.

(10) Patent No.: US 7,533,757 B2
(45) Date of Patent: May 19, 2009

(54) STEERING SYSTEM AND METHOD OF CONTROL

(75) Inventors: Nobuo Sugitani, Saitama (JP); Yoshimitsu Akuta, Saitama (JP); Hisao Asaumi, Saitama (JP); Hitoshi Iwai, Saitama (JP); Masaaki Kawano, Saitama (JP); Takashi Nishimori, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 468 days.

(21) Appl. No.: 11/265,606

(22) Filed: Nov. 2, 2005

(65) Prior Publication Data

US 2006/0090954 A1 May 4, 2006

(30) Foreign Application Priority Data

Nov. 2, 2004 (JP) .............................. 2004-319289

(51) Int. Cl.
*B62D 5/04* (2006.01)
(52) U.S. Cl. ...................................... 180/402; 180/446
(58) Field of Classification Search ................. 180/402, 180/403, 444, 443, 446; 318/334, 434; 701/41, 701/43
See application file for complete search history.

(56) References Cited

U.S. PATENT DOCUMENTS

| 4,789,040 A * | 12/1988 | Morishita et al. | 180/446 |
| 6,705,420 B2 * | 3/2004 | Ono et al. | 180/407 |
| 7,163,080 B2 * | 1/2007 | Fardoun et al. | 180/446 |
| 2004/0211618 A1 * | 10/2004 | Ogawa et al. | 180/402 |
| 2005/0178606 A1 * | 8/2005 | Husain et al. | 180/408 |

FOREIGN PATENT DOCUMENTS

| JP | 2004-142542 | 5/2004 |
| JP | 2004-194385 | 7/2004 |
| JP | 2004-256018 | 9/2004 |

* cited by examiner

*Primary Examiner*—Anne Marie M. Boehler
(74) *Attorney, Agent, or Firm*—Carrier, Blackman & Associates, P.C.; William D. Blackman; Joseph P. Carrier

(57) ABSTRACT

A steering system includes a steering wheel, a steering angle sensor detecting a steering angle, a steering motor steering road-wheels, a reaction motor imparting a reaction force to the steering wheel, an ECU driving the steering motor with respect to a detected steering angle and a temperature detecting unit detecting temperatures of the steering motor, the reaction motor or a constituent member involved in the temperatures of the motors. When the temperature detected is larger than a predetermined value, the ECU performs such that a ratio of the rotating angle to the steering angle is made smaller than one that is to result when the temperature is equal to or smaller than the predetermined value, or a reaction force that is to be imparted to the steering wheel is made larger.

4 Claims, 4 Drawing Sheets

STEERING SYSTEM AND METHOD OF CONTROL

The present invention claims foreign priority under 35 USC 119 based on Japanese patent application No. P.2004-319289, filed on Nov. 2, 2004, the content of which is incorporated herein by reference.

BACKGROUND OF THE INVENTION

1. Field of the Invention

The present invention relates to a steering system, in which an operating element that is to be operated by a driver, is not mechanically connected to steered road-wheels to be steered or rotated to steer a vehicle.

2. Description of the Background Art

In a so-called SBW (steer-by-wire) type steering system in which a steering wheel (an operating element) that is to be operated by the driver, and steered road-wheels are not mechanically connected to each other, the steered road-wheels are turned by a steering motor and a reaction force is imparted to the operating element by a reaction motor. These motors are controlled independently, whereby a ratio of a rotating angle of the steered road-wheels to a steering input to the operating element is varied depending on vehicle speeds to thereby largely contribute to the stabilization of the behaviors of a vehicle.

In this SBW type steering system, since it is only the drive force of the steering motor that turns the steered road-wheels with no steering effort that is inputted to the operating element by the driver imparted to the steered road-wheels, the steering motor of the SBW type steering system needs a larger output than that of a steering motor for a steering system in which the operating element and the steered road-wheels are mechanically connected (hereinafter, referred to as an electric power steering).

Consequently, even compared in the same driving conditions, more heat is generated in the steering motor and a power drive unit which controls the drive of the steering motor in the SBW type steering system than in the electric power steering. Due to this, in such a situation that a large load is applied to a rotating system as when the steered wheels are rotated about their swivel pins at extremely low speeds or during stationary steering, the heat generation in a steering system needs to be suppressed.

Japanese Patent Unexamined Publication No. JP-A-2004-194385 discloses a technique to reduce power supplied to the reaction motor when the temperature of the reaction motor reaches or exceeds a predetermined temperature.

However, when the supply of power to the reaction motor is reduced when the temperature of the reaction motor reaches or exceeds the predetermined temperature as described the JP-A-2004-194385, while the increase in the temperature of the reaction motor can be suppressed, since the reaction force is reduced, the driver is then allowed to increase the steering input to the operating element with ease, and as a result, the load to the steering motor is increased, causing a problem that the generation of heat in the steering motor is promoted. Note that in the SBW type steering system, the steering motor is generally required to have a larger output than the reaction motor.

SUMMARY OF THE INVENTION

The present invention was made to provide a steering system which can suppress the increase in the temperature of a steering system in an ensured fashion.

With a view to solving the problem, according to a first aspect of the invention, there is provided a steering system (for example, a steering system 1 in an embodiment which will be described later on) comprising:

an operating element (for example, a steering wheel 11 in the embodiment which will be described later on) operated by a driver;

a steering input detecting unit (for example, a steering angle sensor 13 in the embodiment which will be described later on) detecting a steering input that is inputted to the operating element;

a steering actuator (for example, a steering motor 25 in the embodiment which will be described later on) steering steered road-wheels (for example, road-wheels 21 in the embodiment which will be described later on) which are mechanically disconnected from the operating element;

a reaction actuator (for example, a reaction motor 12 in the embodiment which will be described later on) which imparts a reaction force to the operating element;

a control unit (for example, an ECU 40 in the embodiment which will be described later on) which drives the steering actuator in accordance with the steering input detected by the steering input detecting unit; and a temperature detecting unit (for example, the ECU 40 in the embodiment which will be described later on) for detecting temperature of the steering actuator, temperature of the reaction force actuator or temperature of a constituent member (for example, a reaction motor power drive unit 16, a steering motor power drive unit 28 in the embodiment which will be described later on) that is involved in the temperatures of the steering and reaction force actuators, wherein the control unit determines a ratio of the rotating angle to the steering input or a reaction force to be imparted to the operating element such that:

in the event that a temperature detected by the temperature detecting unit is equal to or smaller than a primary predetermined temperature, the ratio of the rotating angle or the reaction force is made a first value; and in the event that the temperature detected by the temperature detecting unit is larger than the primary predetermined temperature, the ratio of the rotating angle is made smaller than the first value, or the reaction force is made larger than the first value.

By adopting the above configuration, the load applied to the steering actuator can be reduced by reducing a ratio of the rotating angle to a steering input. In addition, excessively quick steering by the driver can be suppressed by increasing the reaction force imparted to the operating element, and as a result, the increase in the load applied to the steering actuator can be suppressed.

According to a second aspect of the present invention in addition to the features set forth in the first aspect of the present invention, it is preferable that the steering system further comprises a connecting unit (for example, a clutch 30 in the embodiment which will be described later on) which is capable of establishing mechanical connection and disconnection between the operating element and the steered road-wheels, wherein in the event that the temperature detected by the temperature detecting unit is equal to or larger than a secondary predetermined temperature, which is larger than the primary predetermined temperature, the connecting unit establishes the mechanical connection between the operating element and the steered road-wheels.

By adopting the above configuration, the steering effort inputted to the operating element by the driver can be utilized as a drive force which steers the drive road-wheels about their swivel pins by bringing the connecting unit into engagement, and as a result, the load applied to the steering actuator can be reduced.

According to a third aspect of the present invention, in addition to the features set forth in the second aspect of the present invention, it is preferable that the control unit controls a second value of the ratio of the rotating angle to the steering input or the reaction force in such a manner that:

as the temperature increases to the secondary predetermined temperature, the second value of the ratio of the rotating angle to the steering input or the reaction force is made substantially equal to a value of the ratio of the rotating angle to the steering input or the reaction force which is obtained when the mechanical connection between the operating element and the steered road-wheels is established.

According to a fourth aspect of the present invention, in addition to the features set forth in the first aspect of the present invention, it is preferable that the control unit controls both the ratio of the rotating angle to the steering input and the reaction force.

According to the first aspect of the invention, since the load applied to the steering actuator can be reduced by reducing the ratio of the rotating angle to the steering input, and additionally, excessively quick steering by the driver can be suppressed by increasing the reaction force imparted to the operating element, the increase in the load applied to the steering actuator can be suppressed, and the increase in the temperatures of the steering actuator and the constituent member involved therein can be prevented, thereby making it possible to eliminate the generation of a drawback attributed to heat that would otherwise be generated.

According to the second aspect of the invention, since the load applied to the steering actuator can be reduced by bringing the connection unit into engagement, the increase in the temperatures of the steering actuator and the constituent member involved therein can be prevented, thereby making it possible to eliminate the generation of a drawback attributed to heat that would otherwise be generated.

DETAILED DESCRIPTION OF THE PREFERRED EMBODIMENTS

An embodiment of a steering system according to the invention will be described below by reference to FIGS. 1 to 5.

Figure 1:
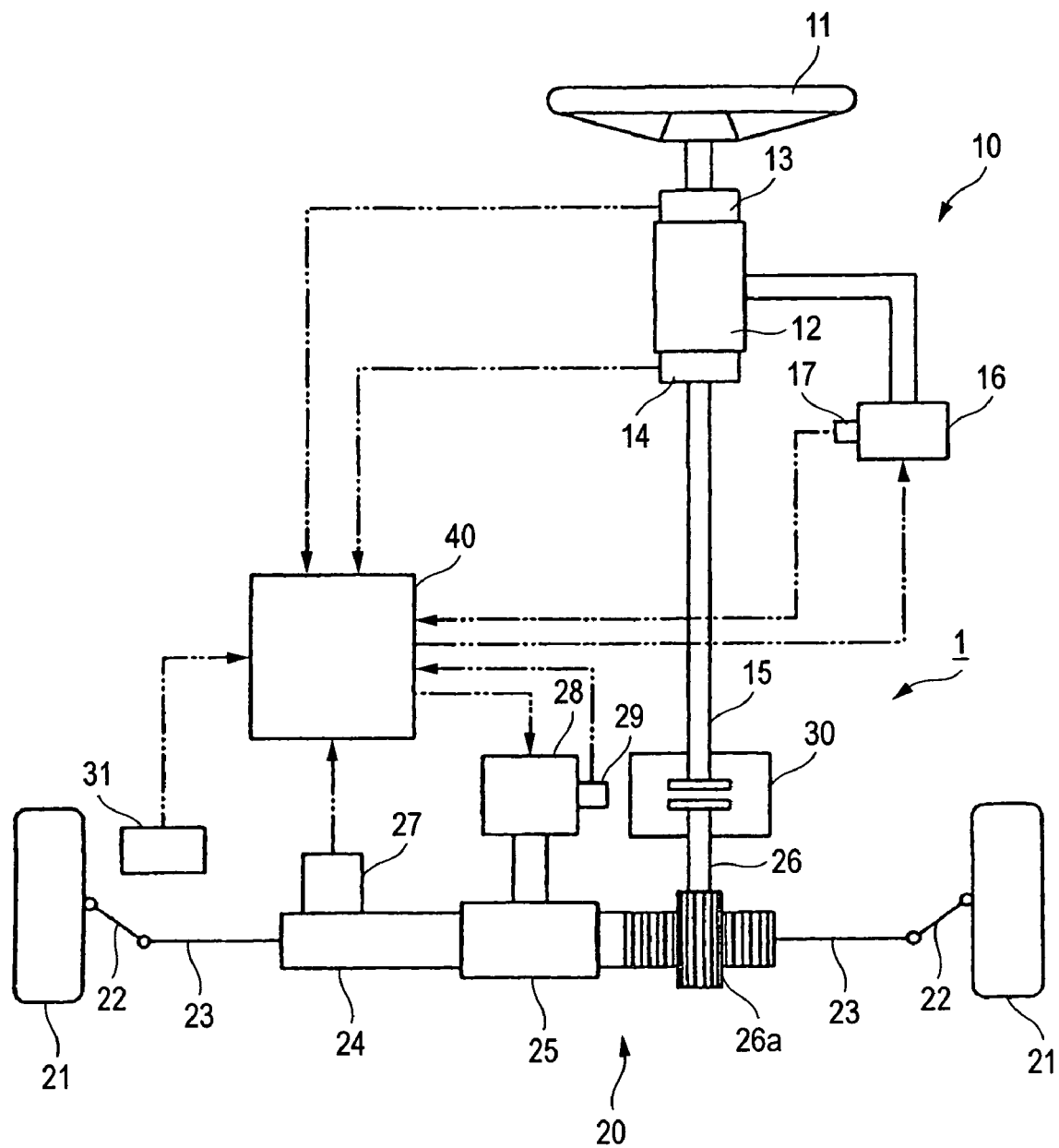
FIG. 1 is a schematic diagram which shows the configuration of an SBW type steering system according to the invention.

As shown in FIG. 1, an SBW type steering system 1 includes a steering input unit (a steering unit) 10 and a steering output unit (a steering unit) 20 which steers steered road-wheels, and the steering input unit 10 and the steering output unit 20 are made to be mechanically connected to and disconnected from each other via a clutch unit 30. In addition, the steering output unit 20 is electrically controlled by a steering electronic control unit (ECU) 40 based on a steering input to the steering input unit 10.

The steering input unit 10 is made up of a steering wheel 11 that is operated by a driver, a reaction motor 12 which imparts a reaction torque to the steering wheel 11, a steering angle sensor 13 which detects a steering angle of the steering wheel 11 and outputs an electric signal corresponding to the steering angle so detected to the ECU 40, a steering torque sensor 14 which detects a steering torque applied to the steering wheel 11 and outputs an electric signal corresponding to the steering torque so detected to the ECU 40 and a steering shaft 15 which is directly connected to the steering wheel 11. Power is supplied to the reaction motor 12 via a reaction motor power drive unit 16 which is controlled by the ECU 40. The reaction motor power drive unit 16 includes a current sensor 17 which detects a current supplied to the reaction motor 12 and outputs an electric signal corresponding to the current so detected to the ECU 40.

Note that the steering wheel 11 is spring biased towards a neutral position at all times by an appropriate spring mechanism or the like (not shown).

The steering output unit 20 is made up of a steering rod 24 connected to left and right road-wheels (steered road-wheels) 21 via knuckle arms 22 and tie-rods 23, a steering motor (a steering actuator) 25 which drives the steering rod 24 in an axial direction via a gear mechanism (not shown) so as to steer the road-wheels 21, a sub-steering shaft 26 which can drive the steering rod 24 in the axial direction via a rack-and-pinion mechanism 26a, and a rotating angle sensor 27 which detects a rotating angle of the road-wheels 21 and outputs an electric signal corresponding to the rotating angle so detected to the ECU 40. The steering rod 24 is moved to the left and right in the axial direction by rotating the steering motor 25 clockwise and counterclockwise, so that the road-wheels 21 can be steered angularly to the left and right. Power is supplied to the steering motor 25 via a steering motor power drive unit 28 which is controlled by the ECU 40. The steering motor power drive unit 28 detects a current supplied to the steering motor 25 and outputs an electric signal corresponding to the current so detected to a current sensor 29.

The clutch unit 30 is made to mechanically connect and disconnect the steering shaft 15 of the steering input unit 10 and the sub-steering shaft 26 of the steering output unit 20 to and from each other, and the engagement/disengagement or release of the clutch unit 30 is controlled by the ECU 40. The ECU 40 releases the clutch unit 30 from an engaged state when the steering system 1 is made to function as the originally intended SBW type steering system, and brings the clutch unit 30 into engagement when the road-wheels 21 are made to be steered by a steering effort inputted to the steering wheel 11.

A vehicle speed sensor 31 which detects a speed of the vehicle is mounted at an appropriate position on a body of the vehicle and outputs an electric signal corresponding to the speed of the vehicle detected by the sensor to the ECU 40.

The ECU 40 calculates a target rotating angle based on signals from the steering angle sensor 13 and the vehicle speed sensor 31, calculates a target current of power that is caused to flow to the steering motor 25 such that an output value (namely, an actual rotating angle of the road-wheels 21) of the rotating angle sensor 27 coincides with the target rotating angle so calculated and outputs the target current so calculated to the steering motor power drive unit 28. The steering motor power drive unit 28 then receives the target current to thereby supply power to the steering motor 25 at the target current, whereby a rotating angle ratio is set in accordance with the steering angle inputted to the steering wheel 11 and the vehicle speed in the SBW type steering system 1. Note that in this application, the ECU 40 functions as a rotating angle ratio determining unit, and sets a ratio of rotating angle relative to steering angle (rotating angle/steering angle).

In addition, the ECU 40 calculates a target steering reaction force based on signals from the vehicle speed sensor 31 and the rotating angle sensor 27, as well as a deviation signal between the target rotating angle and an actual rotating angle (hereinafter, referred to a rotating angle deviation signal), calculates a target current of power that is caused to flow to the reaction motor 12 such that an output value (namely, an actual steering torque) of the steering torque sensor 14 coincides with the target steering reaction force so calculated and outputs the target current so calculated to the reaction motor power drive unit 16. Then, the reaction motor power drive unit 16 receives the target current to thereby supply power to the reaction motor 12 at the target current, whereby a steering reaction force according to the vehicle speed, rotating angle and rotating angle deviation signal is applied to the steering wheel 11 in the SBW type steering system 1.

Furthermore, in the SBW type steering system 1, in order to prevent overheating of the steering motor 25, the steering motor power drive unit 28, the reaction motor 12 and the reaction motor power drive unit 16, a temperature increase suppressing process is implemented in steps according to temperatures.

Namely, when the temperature is higher than the predetermined temperature, in a first-step temperature increase suppressing process, the steering reaction force applied to the steering wheel 11 is made larger than one resulting when the temperature is normal, whereby excessively quick steering by the driver is suppressed, and an increase in load to the steering output unit 20 is suppressed, whereby the increase in the temperatures of the steering motor 25 and the steering motor power drive unit 28 is suppressed.

In the event that the temperatures of the steering motor 25 and the steering motor power drive unit 28 still continue to rise even after the first-step temperature increase suppressing process has been implemented, or in the event that the temperature of the reaction motor 12 or the reaction motor power drive unit 16 has increased to a predetermined temperature as a result of the implementation of the first-step temperature increase suppressing process, the rotating angle ratio is reduced gradually so as to become smaller than when the temperature is normal as a second-step temperature increase suppressing process while the first-step temperature increase suppressing process continues to be implemented, whereby the load on the steering output unit 20 is made to continue to be reduced, so that the increase in the temperatures of the steering motor 25 and the steering motor power drive unit 28 is suppressed.

In the event that the temperatures still continue to rise to thereby reach a predetermined threshold temperature even after the second-step temperature increase suppressing process has been implemented, the steering wheel 11 and the steering rod 24 are connected to each other via the rack-and-pinion mechanism 26a by bringing the clutch unit 30 into engagement as a third-step temperature increase suppressing process, whereby a steering effort inputted to the steering wheel 11 by the driver comes to be inputted to the steering output unit 20 as a drive force which steers the road-wheels 21, and as a result, the output of the steering motor 25 is reduced so as to suppress the increase in the temperatures of the steering motor 25 and the steering motor power drive unit 28. In addition to this, the output of the steering motor 25 is aggressively restricted (stopped or reduced) so as to suppress the increase in the temperatures of the steering motor 25 and the steering motor power drive unit 28.

Note that when the clutch 30 is brought into engagement in the third-step temperature increase suppressing process, the rotating angle ratio and the steering reaction force are made in advance to coincide with or approximate a rotating angle ratio and a steering reaction force (hereinafter, referred to as a rotating angle ratio in connection and a steering reaction force in connection, respectively) which result when the steering shaft 15 and the sub-steering shaft 26 are connected to each other via the rack-and-pinion mechanism 26a before the clutch is engaged in order to prevent the driver from perceiving a sensation of physical disorder.

In addition, in the event that the temperatures of the steering motor 25 and the steering motor power drive unit 28 are lowered as a result of the implementation of the third-step temperature increase suppressing process, the clutch 30 is released or disengaged so as to mechanically disconnect the steering input unit 10 from the steering output unit 20 to thereby restore the originally intended SBW type steering system. Also, as this occurs, in order to prevent the driver from perceiving a sensation of physical disorder, the rotating angle ratio and the steering reaction force are set in advance to optimal values before the clutch 30 is released.

Next, referring to flowcharts in FIGS. 2 and 3, the temperature increase suppressing process of the embodiment will be described.

Figure 2:
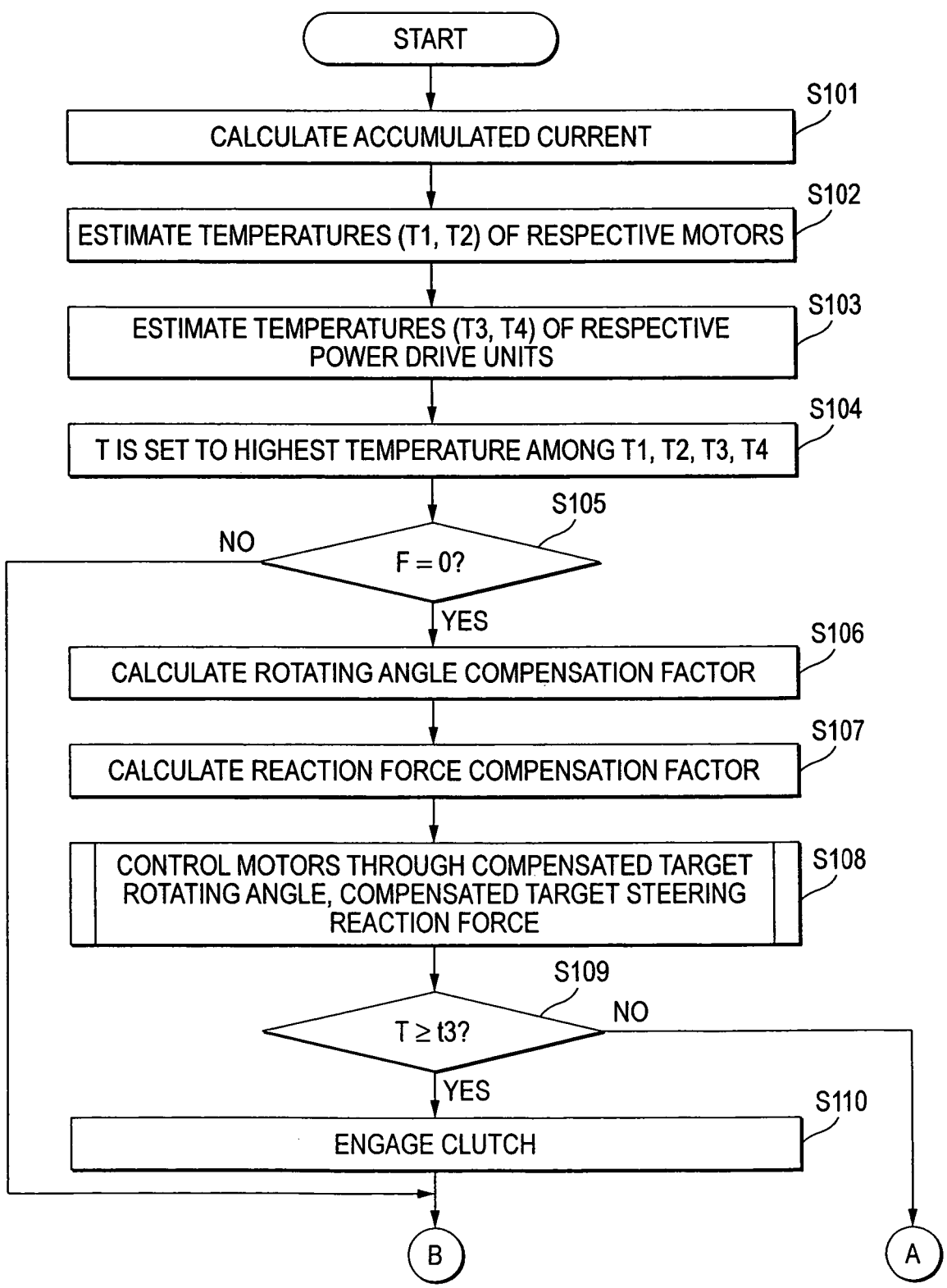
FIG. 2 is a flowchart (Part 1) which illustrates an embodiment of a temperature suppressing control.
Figure 3:
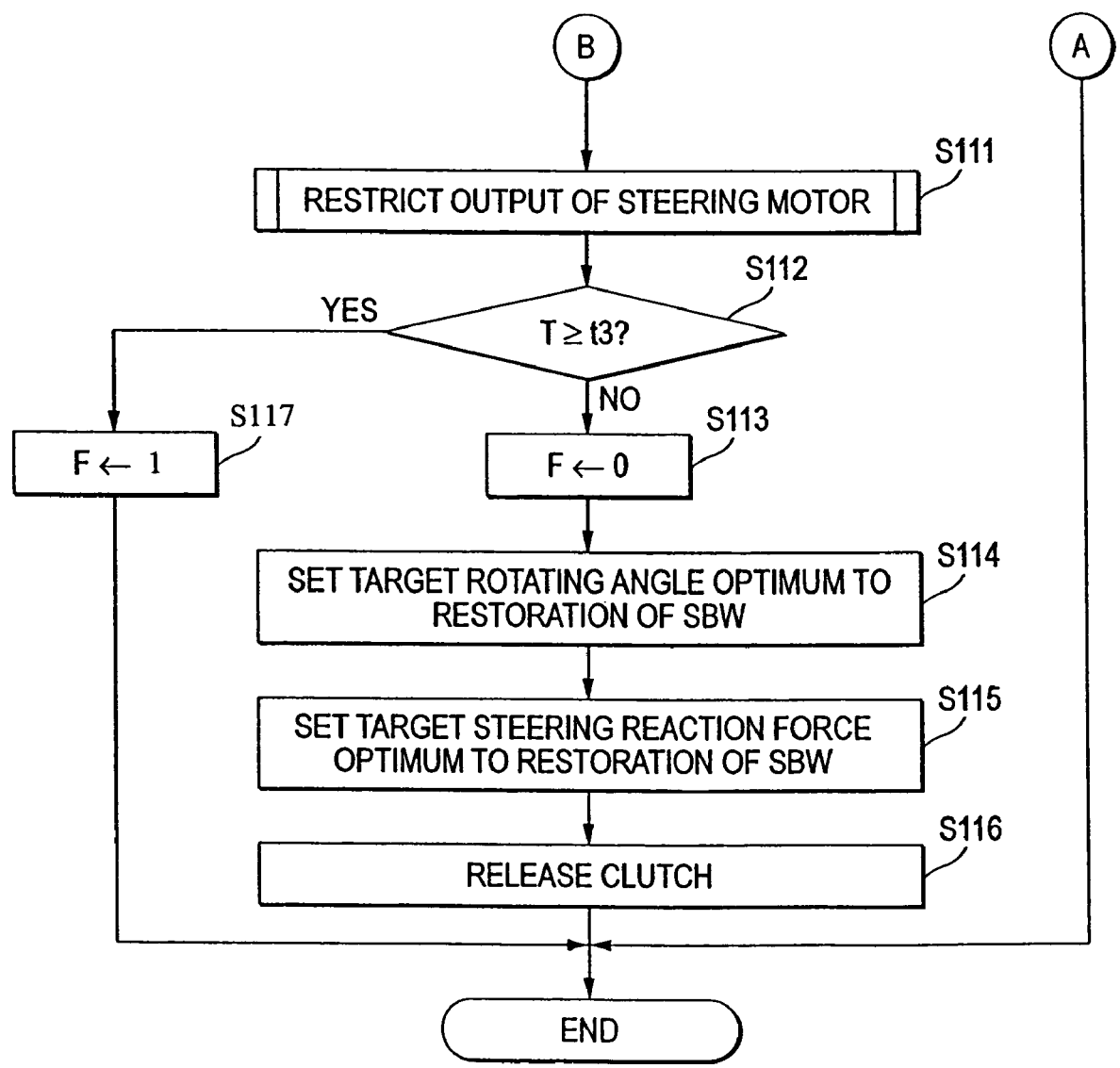
FIG. 3 is a flowchart (Part 2) which illustrates the embodiment of the temperature suppressing control.

A temperature increase suppressing process routine shown in flowcharts in FIGS. 2 and 3 is executed constantly by the ECU 40 every certain length of time.

Firstly, in step S101, the current that has flowed to the steering motor 25 is calculated based on a current value detected by the current sensor 29 of the steering motor power drive unit 28, and the current that has flowed to the reaction motor 12 is calculated based on a current value detected by the current sensor 17 of the reaction motor power drive unit 16.

Next, proceeding to step S102, a temperature T1 of the steering motor 25 is estimated based on a current value calculated as having flowed to the steering motor 25 in step S101, and a temperature T2 of the reaction motor 12 is estimated based on a current value calculated as having flowed to the reaction motor 12 in step S101.

Next, proceeding to step S103, a temperature T3 of the steering motor power drive unit 28 is estimated based on the current value calculated as having flowed to the steering motor 25 in step S101, and a temperature T4 of the reaction motor power drive unit 16 is estimated based on the current value calculated as having flowed to the reaction motor 12 in step S101.

Note that in this embodiment, a temperature detecting unit is realized when the ECU 40 executes the processes in steps S101 to S103.

Next, proceeding to step S104, a highest temperature among the temperature T1 of the steering motor 25 and the temperature T2 of the reaction motor 12, which are estimated in step S102, and the temperature T3 of the steering motor power drive unit 28 and the temperature T4 of the reaction motor power drive unit 16, which are estimated in step S103 is made to be a representative temperature T.

Next, proceeding to step S105, whether or not a temperature determination flag F is "0" is determined. As will be described later on, this temperature determination flag F is set to "0" in step S113 and is then set to "1" in step S117.

Figure 4:
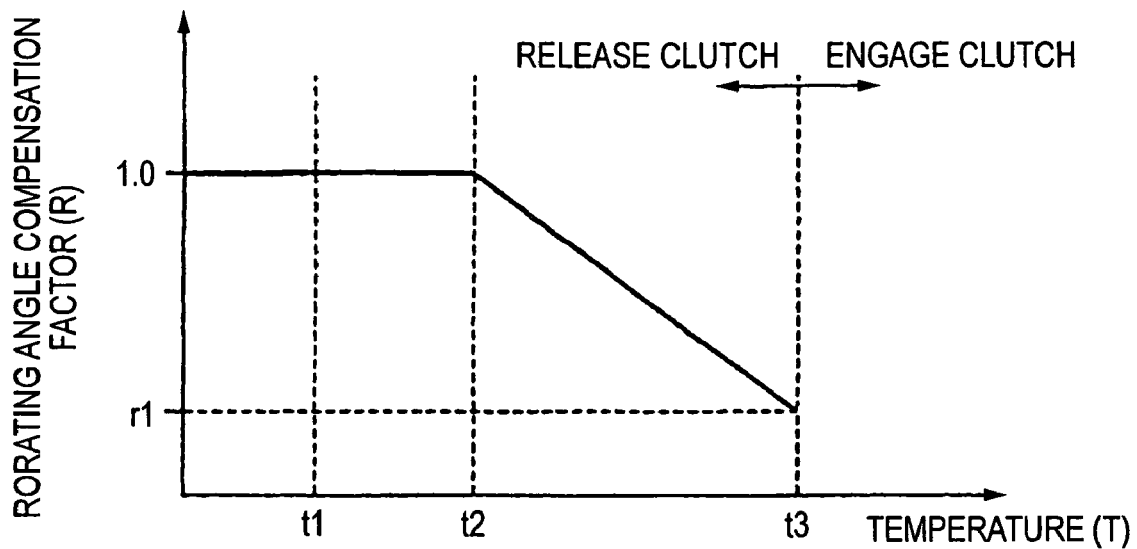
FIG. 4 is a chart which shows an example of a rotating angle compensation factor map used in the temperature increase suppressing process.

If the result of the determination in step S105 is "YES", then proceeding to step S106, a rotating angle compensation factor corresponding to the representative temperature T determined in step S104 is calculated by reference to a rotating angle compensation factor map shown in FIG. 4. In the rotating angle compensation factor map in this embodiment, a rotating angle compensation factor R is 1.0 constantly when the representative temperature T is equal to or lower than a temperature t2, and when the representative temperature T exceeds the temperature t2, the rotating angle compensation factor R reduces gradually continuously as the temperature increases. A rotating angle compensation factor r1 corresponding to a temperature t3 is set such that the rotating angle ratio substantially equals the steering reaction force in connection. Note that the temperature t3 is higher than the temperature t2 (t3>t2) and the rotating angle compensation factor r1 is smaller than 1 (r1<1).

Figure 5:
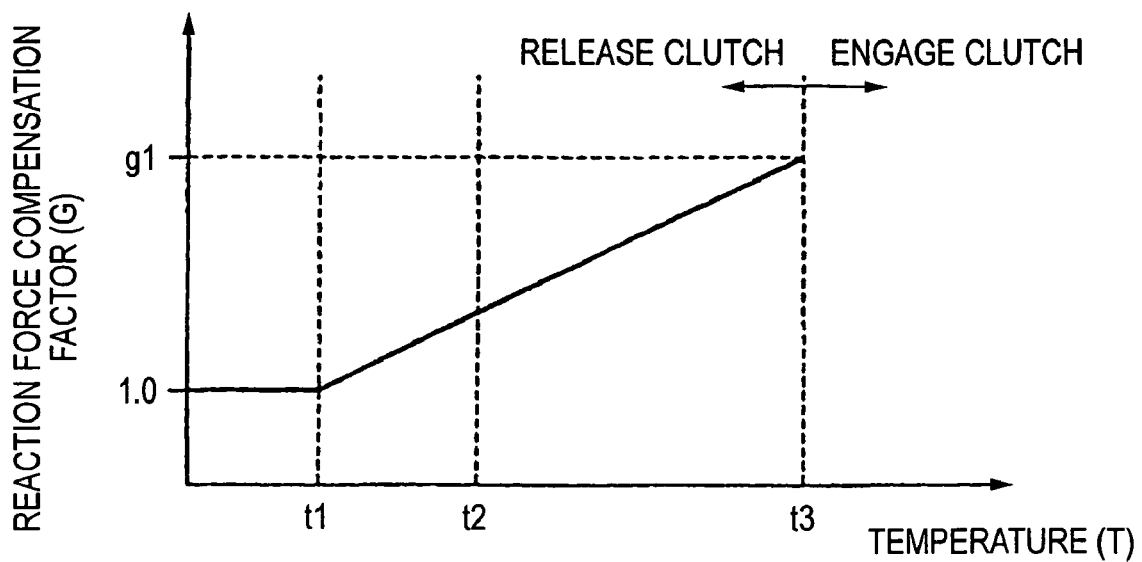
FIG. 5 is a chart which shows an example of a reaction force compensation factor map used in the temperature increase suppressing process.

Next, proceeding to step S107, a reaction force compensation factor G which corresponds to the representative temperature T determined in step S104 is calculated by reference to a reaction force compensation factor map shown in FIG. 5. In the reaction force compensation factor map in this embodiment, the reaction force compensation factor G is 1.0 constantly when the representative temperature T is equal to or lower than a temperature t1, and when the representative temperature T exceeds the temperature t1, the reaction force compensation factor G increases gradually continuously as the temperature increases. A reaction force compensation factor g1 at a temperature t3 is set such that the steering reaction force substantially equals the steering reaction force in connection. Note that the temperature t1 is lower than a temperature t2 (t1<t2) and the reaction force compensation factor g1 is larger than 1 (g1>1).

Next, proceeding to step S108, a compensated target rotating angle is calculated by multiplying the target rotating angle calculated based on the signals from the steering angle sensor 13 and the vehicle speed sensor 31 by the rotating angle compensation factor R calculated in step S106. In addition, a current control is executed on the steering motor 25 such that an output value (namely, an actual rotating angle of the road-wheels 21) of the rotating angle sensor 27 coincides with the compensated target rotating angle so calculated. In further addition, a compensated target steering reaction force is calculated by multiplying the target steering reaction force calculated based on the signals from the vehicle speed sensor 31 and the rotating angle sensor 27 and the rotating angle deviation signal by the reaction force compensation factor G calculated in step S107, and a current control is executed on the reaction motor 12 such that an output value (namely, an actual steering torque) of the steering torque sensor 14 coincides with the compensated target steering reaction force so calculated.

Note that for the sake of a better development of the following discussion, the target rotating angle that is calculated based on signals from the steering angle sensor 13 and the vehicle speed sensor 31 and which has not yet been compensated is referred to as a "basic target rotating angle" and the target steering reaction force that is calculated based on signals from the vehicle sensor 31 and the rotating angle sensor 27 and which has not yet been compensated is referred to as a "basic target steering reaction force."

Next, proceeding to step S109, whether or not the representative temperature T is equal to or higher than the temperature t3 (T·t3) is determined.

If the result of the determination in step S109 is "NO" (T<t3), the implementation of the routine is tentatively stopped there. Namely, the processes in steps S101 to S108 are implemented repeatedly while the representative temperature T remains lower than the temperature t3.

Then, when the representative temperature T is equal to or lower than the temperature t1 during the implementation of the series of processes in steps S101 to S108, since the rotating angle compensation factor R and the reaction force compensation factor G are both "1", the compensated target rotating angle coincides with the basic target rotating angle, and the compensated target steering reaction force coincides with the basic target steering reaction force. Namely, in a temperature area where the representative temperature T is equal to or lower than the temperature t1, both the rotating angle ratio and the steering reaction force become the rotating angle ratio and the steering reaction force which result when the temperature is normal.

In addition, in a temperature area where the representative temperature T is higher than the temperature t1 but is equal to or lower than the temperature t2, while the rotating angle compensation factor R remains at "1", the reaction force compensation factor G gradually becomes larger than 1. Namely, in the temperature area where the representative temperature T is higher than the temperature t1 but is equal to or lower than the temperature t2, while the rotating angle ratio is set to one, which results when the temperature is normal, the steering reaction force is set to a value which is larger than the steering reaction force which results when the temperature is normal. Namely, the first-step temperature increase suppressing process is implemented.

In addition, in a temperature area where the representative temperature T is higher than the temperature t2 but is equal to or lower than the temperature t3, the reaction compensation factor G continues to gradually increase, and in addition to this, the rotating angle compensation factor R gradually becomes smaller than 1. Namely, in the temperature area where the representative temperature T is higher than the temperature t2 but is equal to or lower than the temperature t3, the steering reaction force is set to a value which is larger than the steering reaction force which results when the temperature is normal, and the rotating angle ratio is set to a value which is smaller than the rotating angle ratio which results when the temperature is normal. Namely, the second-step temperature increase suppressing process is implemented.

Then, if the result of the determination in step S109 is "YES" (T·t3), proceeding to step S110, the clutch 30 is brought into engagement, so that the steering shaft 15 and the sub-steering shaft 26 are connected to each other via the rack-and-pinion mechanism 26a, whereby the steering effort inputted to the steering wheel 11 by the driver comes to be inputted to the steering output unit 20 as a drive force which rotates the road-wheels 21 about their swivel pins. As a result, the output of the steering motor 25 can be reduced, thereby making it possible to suppress the increase in the temperatures of the steering motor 25 and the steering motor power drive unit 28. Namely, the third-step temperature increase suppressing process is implemented.

Note that since the rotating angle compensation factor R is set to a value which allows the rotating angle ratio to substantially equal the rotating angle ratio in connection and the reaction force compensation factor G is set to a value which allows the steering reaction force to substantially equal the steering reaction force in connection just before the representative temperature T becomes the temperature t3 (namely, just before the clutch 30 is brought into engagement), there is no case where the driver feels a sensation of physical disorder when the clutch 30 is engaged.

Next, proceeding to step S111, the steering motor 25 is stopped or the output thereof is reduced. Namely, the output of the steering motor 25 is limited, whereby the increase in the temperatures of the steering motor 25 and the steering motor power drive unit 28 can be suppressed.

Next, proceeding to step S112, whether the representative temperature T is equal to or higher than the temperature t3 (T·t3) is determined. If the result of the determination in step S112 is "YES" (T·t3), then proceed to step S117, where the temperature determination flag F is set to "1" and the execution of the routine is tentatively stopped there. Namely, in this case, the series of processes in steps S101 to S105 (the third-step temperature increase suppressing process) continues to be implemented in such a state that the clutch 30 continues to be in engagement.

On the other hand, if the result of the determination in step S112 is "NO" (T<t3), since this means that the temperatures of the steering motor 25 and the steering motor power drive unit 28 are reduced, then proceed to step S113, where the temperature determination flag F is set to "0", and furthermore, proceed to steps S114 and S115 for preparation for disengagement of the clutch 30. Namely, in order for the driver not to have to feel a sensation of physical disorder when the clutch is released or disengaged, in steps S114 and S115, a target rotating angle and a target steering reaction force are respectively set which are optimum to the restoration of the originally intended SBW type steering system in which the clutch is in the released or disengaged state.

Next, proceeding to step S116, the clutch 30 is released, so that the originally intended SBW type steering system is restored, and the execution of the routine is tentatively stopped there.

According to the SBW type steering system 1 that is configured as has been described heretofore, since the rotating angle ratio and the steering reaction force are set such that the loads on the steering input unit 10 and the steering output unit 20 are reduced in accordance with the temperature conditions thereof, heat generated in the steering motor 25, the steering motor power drive unit 28, the reaction motor 12 and the reaction motor power drive unit 16 can be reduced without causing the driver to feel a sensation of physical disorder abruptly even when the steered road-wheels 21 are angularly rotated at extremely low speeds as when the vehicle is parked in the garage or during stationary steering in which heat is easily generated.

In addition, in the event that the temperatures still continue to rise even in that situation, the steering input unit 10 and the steering output unit 20 are brought into mechanical connection with each other without causing the driver to feel a sensation of physical disorder so as to reduce the load on the steering motor 25 or the like, thereby making it possible to reduce heat generated. Then, when the mechanical connection between the steering input unit 10 and the steering output unit 20 is no longer required due to the heat generated being so reduced, the steering input unit 10 is mechanically disengaged from the steering output unit 20 so that the originally intended SBW type steering system can be restored.

OTHER EMBODIMENTS

Note that the invention is not limited to the embodiment that has been described heretofore.

For example, while in the aforesaid embodiment, the temperatures of the reaction motor 12, the reaction motor power drive unit 16, the steering motor 25 and the steering motor power drive unit 28 are estimated through the calculation of current, these temperatures may be detected direct by temperature sensors (temperature detecting unit).

While the present invention has been described in connection with the preferred embodiments thereof, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A method of controlling a steering system, the steering system comprising
    an operating element operated by a driver;
    a steering input detecting unit which detects a steering input that is inputted to the operating element;
    a steering actuator which actuates steered road-wheels to rotate through a rotating angle, the steered road-wheels configured to be mechanically disconnected from the operating element;
    a reaction force actuator which imparts a reaction force to the operating element;
    a control unit which drives the steering actuator in accordance with the steering input detected by the steering input detecting unit; and
    a temperature detecting unit which detects a temperature of the steering actuator and the reaction force actuator,
    wherein the control of the steering system comprises the following method steps:
        determination of a representative temperature based on the detected temperatures,
        determination of a ratio of the rotating angle to the steering input, and
        determination of a reaction force to be imparted to the operating element, and wherein:
        when the representative temperature is equal to or lower than a primary predetermined temperature, normal operating conditions are implemented, in which the ratio of the rotating angle to the steering input is set to a first ratio value, and the reaction force is set to a first force value;
        when the representative temperature is higher than the primary predetermined temperature and lower than a second predetermined temperature, the second predetermined temperature being higher than the primary predetermined temperature, a first heat mitigation step is implemented, in which the ratio of the rotating angle to the steering input remains set at the first ratio value, and the reaction force is set at a second force value greater than the first force value; and
        when the representative temperature is higher than the second predetermined temperature and lower than a third predetermined temperature, the third predetermined temperature being higher than the second predetermined temperature, a second heat mitigation step is implemented, in which the ratio of the rotating angle to the steering input is set at a value less than the first ratio value, and the reaction force is set at a third force value greater than the second force value.

2. The method of claim 1, the steering system further comprising:
    a connecting unit which is configured to selectively establish a mechanical connection or disconnection between the operating element and the steered road-wheels,
    wherein when the representative temperature is equal to or larger than the third predetermined temperature, a further method step comprises
    implementing a third heat mitigation step by establishing the mechanical connection between the operating element and the steered road-wheels.

3. The method of claim 1, wherein the ratio of the rotating angle to the steering input is determined so as to correspond to the representative temperature, and is calculated by reference to a predetermined rotating angle compensation factor map of the ratio of the rotating angle to the steering input versus temperature.

4. The method of claim 1 wherein the reaction force to be imparted to the operating element is determined so as to correspond to the representative temperature, and is calculated by reference to a predetermined reaction force compensation factor map of reaction force versus temperature.

* * * * *